(12) United States Patent
Sugiyama

(10) Patent No.: US 8,190,882 B2
(45) Date of Patent: May 29, 2012

(54) INFORMATION PROCESSING SYSTEM, INFORMATION PROCESSING APPARATUS AND METHOD, PROGRAM, AND RECORDING MEDIUM

(75) Inventor: Toshinobu Sugiyama, Kanagawa (JP)

(73) Assignee: Sony Corporation (JP)

( * ) Notice: Subject to any disclaimer, the term of this patent is extended or adjusted under 35 U.S.C. 154(b) by 1071 days.

(21) Appl. No.: 11/494,186

(22) Filed: Jul. 27, 2006

(65) Prior Publication Data

US 2007/0028094 A1    Feb. 1, 2007

(30) Foreign Application Priority Data

Aug. 1, 2005    (JP) ................... P2005-223084

(51) Int. Cl.
*H04L 29/06* (2006.01)
(52) U.S. Cl. ........................................... 713/155
(58) Field of Classification Search .................... 713/155
See application file for complete search history.

(56) References Cited

U.S. PATENT DOCUMENTS

| | | | | |
|---|---|---|---|---|
| 5,812,531 | A * | 9/1998 | Cheung et al. | 370/255 |
| 6,393,127 | B2 * | 5/2002 | Vogler | 380/283 |
| 6,400,482 | B1 | 6/2002 | Lupton et al. | |
| 7,570,939 | B2 * | 8/2009 | Culbert | 455/410 |
| 2004/0015693 | A1 * | 1/2004 | Kitazumi | 713/171 |
| 2004/0203590 | A1 | 10/2004 | Shteyn | |
| 2005/0054369 | A1 * | 3/2005 | Murakami | 455/525 |
| 2005/0239439 | A1 * | 10/2005 | Manabe | 455/410 |
| 2005/0249142 | A1 * | 11/2005 | Kim et al. | 370/312 |
| 2005/0276418 | A1 * | 12/2005 | Hagiwara | 380/270 |
| 2006/0045271 | A1 | 3/2006 | Helbig et al. | |
| 2006/0208088 | A1 * | 9/2006 | Sekiguchi | 235/472.02 |

FOREIGN PATENT DOCUMENTS

| | | | |
|---|---|---|---|
| JP | 05083243 | A | 4/1993 |
| JP | 05083707 | A | 4/1993 |
| JP | 2001298779 | A | 10/2001 |
| JP | 2002124960 | A | 4/2002 |
| JP | 2002-530968 | | 9/2002 |
| JP | 2003131921 | A | 5/2003 |
| JP | 2004056762 | A | 2/2004 |
| JP | 2004112571 | A | 4/2004 |
| JP | 2004228793 | A | 8/2004 |
| JP | 2004254320 | A | 9/2004 |
| JP | 2004302846 | A | 10/2004 |
| JP | 2004320139 | A | 11/2004 |
| JP | 2005012688 | A | 1/2005 |

(Continued)

OTHER PUBLICATIONS

Office Action from Japanese Application No. 2005-223084, dated Jun. 2, 2011.

(Continued)

*Primary Examiner* — Michael S McNally
(74) *Attorney, Agent, or Firm* — Lerner, David, Littenberg, Krumholz & Mentlik, LLP

(57) ABSTRACT

An information processing system is disclosed which configured to: distribute publicly a first key by a change in a ray of light emitted from a light source; extract the first key from the ray of light emitted from the light source; encrypt a second key with the extracted first key to transmit the encrypted second key in short-distance communication; receive the encrypted second key and decrypting the received second key; and transfer information by use of the second key as a common key.

5 Claims, 16 Drawing Sheets

FOREIGN PATENT DOCUMENTS

| | | |
|---|---|---|
| JP | 2005020746 A | 1/2005 |
| JP | 2005033265 A | 2/2005 |
| JP | 2005184830 A | 7/2005 |
| JP | 2005-536093 | 11/2005 |
| JP | 2005318281 A | 11/2005 |
| JP | 2005-538636 | 12/2005 |
| WO | 2004025901 A2 | 3/2004 |

OTHER PUBLICATIONS

Warwick Ford et al., "Digital signature and encryption technology", Prentice Hall publication Co., Ltd., Dec. 24, 1997, First edition, p. 166. (English translation of Japanese Office Action indicates degree of relevance.).

Kaoru Kurosawa, Wakaha Ogata, "Basic mathematics of a modern encryption", Corona company Co., Ltd., Mar. 31, 2004, First edition, p. 52. (English translation of Japanese Office Action indicates degree of relevance.).

Takumi Nomura et al., "An ecryption system by infrared encryption key delivery", Institute of Electronics, Information and Communication Engineers 2005 general meeting lecture memoirs, Communication 1, Corporate judicial person Institute of Electronics, Information and Communication Engineers, Mar. 7, 2005 p. 621. (English translation of Japanese Office Action indicates degree of relevance.).

Suita Tomoaki, "Book Which is understanding for All of the Codes", Technical Hyoronsha Inc., Jul. 25, 1998, the first edition, p. 169-170.

Office Action from Japanese Application No. 2005-223084, dated Oct. 13, 2011.

* cited by examiner

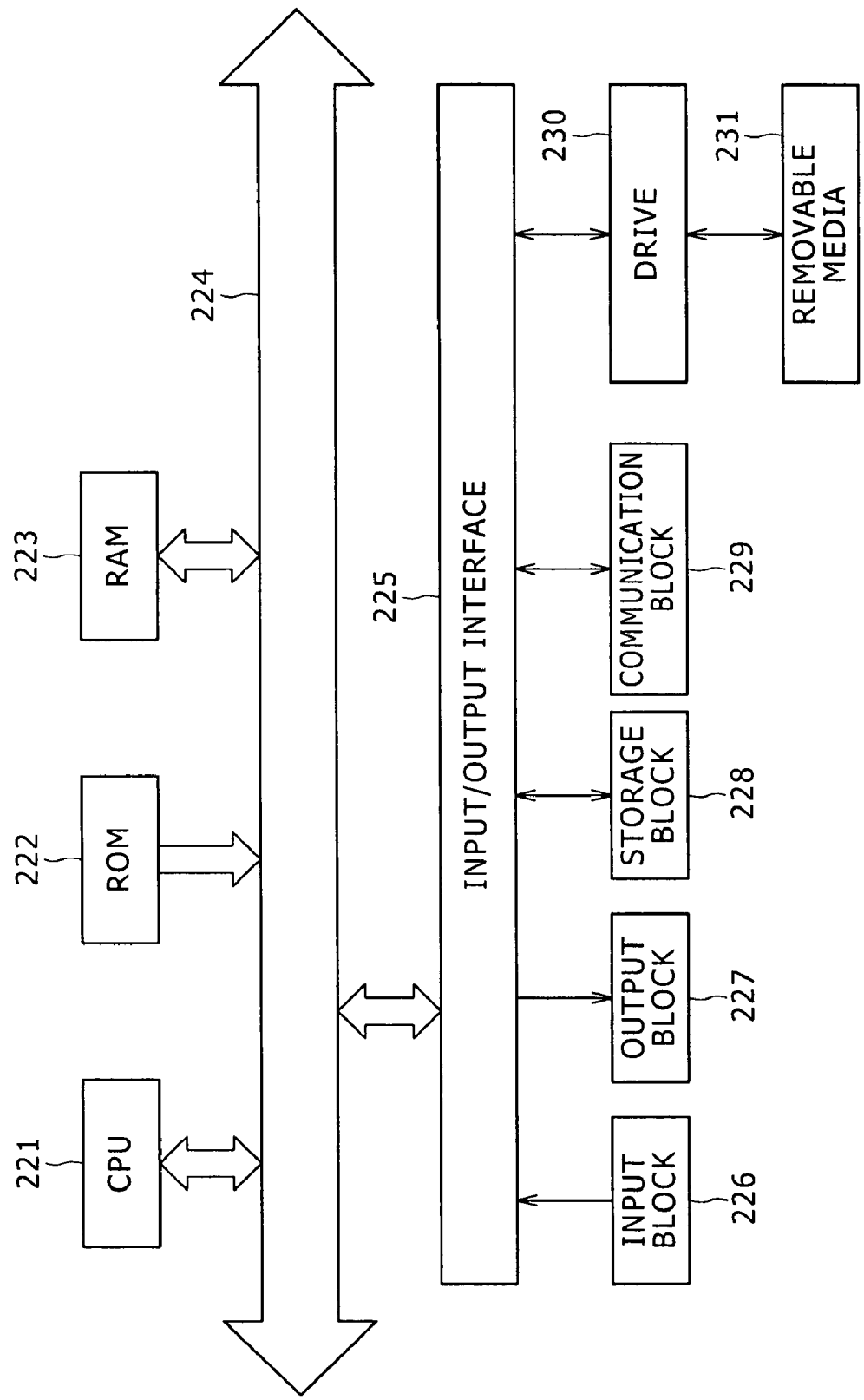

INFORMATION PROCESSING SYSTEM, INFORMATION PROCESSING APPARATUS AND METHOD, PROGRAM, AND RECORDING MEDIUM

CROSS REFERENCE TO RELATED APPLICATIONS

The present application claims priority from Japanese Patent Application No. JP 2005-223084 filed on Aug. 1, 2005, the disclosure of which is hereby incorporated by reference herein.

BACKGROUND OF THE INVENTION

1. Field of the Invention

The present invention relates to an information processing system, an information processing apparatus and method, a computer program, and a recording medium and, more particularly, to an information processing system, an information processing apparatus and method, a computer program, and a recording medium that are capable of transferring information quickly, freely, and securely.

2. Description of the Related Art

Recently, the increasing number of access points is available to allow personal computer users to access the Internet when they are away from home or office. A method is proposed in which authentication is executed by use of password and user ID at each access point arranged away from home and office through which a user accesses the Internet (refer to "802.11 High-Speed Wireless LAN Textbook", pages 334 and 335).

The following describes an operation of an access point to be authenticated by use of password and the user ID with reference to FIG. 1. In a system shown in FIG. 1, the communication between a client 1 and an access point 2 is executed through radio and the communication between the access point 2 and an authentication server 3 is executed in a wired manner.

Before accessing the Internet through an access point away from home or office, each user must make user registration to get a password and a user ID. Then, in step S1, the client 1 sends a connection request to the access point 2.

In step S21, receiving the connection request from the client 1, the access point 2 sends the received connection request to the authentication server 3 in step S22. In step S51, receiving the connection request, the authentication server 3 determines whether a response to this request is enabled now. In step S52, the authentication server 3 outputs a connection response corresponding to the decision to the access point 2.

Receiving the connection response in step S23, the access point 2 sends the received connection response to the client 1 in step S24. In step S2, the client 1 receives the connection response.

In step S53, the authentication server 3 sends a public key and a certificate published beforehand by a certification body, not shown, to the access point 2. In step S25, the access point 2 receives these public key and certificate. In step S26, the access point 2 sends the received public key and certificate to the client 1. In step S3, the client 1 receives the public key and the certificate supplied from the access point 2.

The certificate contains plaintext data, such as specification version, serial number, public key owner, and public key, and a digital signature based on these data. The client 1 can compare the contents obtained by decrypting the digital signature by the public key with the already obtained plaintext specification version, serial number, public key owner, and public key to confirm that the received public key and the certificate thereof are the ones received from a true authentication server, namely, an administrator authenticated by the certification body. Therefore, the user can securely connect to the Internet through that authentication server.

In step S4, the client 1 generates an encryption key to be used for a common key for transmitting and receiving information with the authentication server 3, encrypts the generated encryption key by the public key received from the access point 2, and sends the encrypted encryption key to the access point 2. In step S27, the access point 2 receives this encryption key. In step S28, the access point 2 sends the received encryption key to the authentication server 3. In step S54, the authentication server 3 receives the encryption key, decrypts the received encryption key by a private key corresponding to the public key, and uses the decrypted encryption key as a common key.

On the other hand, in step S5, the client 1 encrypts the user ID by the encryption key and sends the encrypted user ID to the access point 2. In step S6, the client 1 encrypts the password by the encryption key and sends the encrypted password to the access point 2. In step S29, the access point 2 receives the user ID and, in step S31, the password. In step S30, the access point 2 sends the user ID to the authentication server 3 and, in step 32, sends the password to the authentication server 3. In step S55, the authentication server 3 receives the user ID and, in step S56, the password. The authentication server 3 decrypts the received user ID and password by the encryption key received in step S54, thereby confirming that the user ID and the password are ones owned by a registered user.

If the client 1 is found to be an authorized user by the user ID and the password, the client 1 completes the connection procedure with the authentication server 3 via the access point 2 in step 7 and the authentication server 3 completes the connection procedure with the client 1 via the access point 2 in step S57. Subsequently, the client 1 can connect to the Internet via the access point 2 and the authentication server 3 to get various services from the Internet.

The user is able to connect to the Internet through the access point 2 and the authentication server as required to receive the supply of the various service because the access points 2 are arranged at many places.

However, the related-art technology requires each user to make registration beforehand to get an ID and a password for the connection to the Internet by use of an access point. Therefore, it is difficult for service providers to promptly and unrestrainedly provide information, which in turn makes it difficult for users to get information promptly and unrestrainedly.

To overcome the above-mentioned problem, the registration of user ID and password beforehand and the use of a certificate may be skipped, but at the cost of possibility of falling victim to wireless LAN phishing. To be more specific, cases were reported in which a person attempting phishing emits unauthorized radio wave within a service range of an access point to make a user client that has received this radio wave display a fake Web page, thereby causing the client to automatically download computer viruses if the user clicks anywhere on the displayed fake Web page.

Therefore, the present invention addresses the above-identified and other problems associated with related-art technologies and solves the addressed problems by transmitting and receiving information promptly and with little restraint.

SUMMARY OF THE INVENTION

In carrying out the invention and according to one embodiment thereof, there is provided an information processing system and method. The information processing system and method publicly distribute a first key by a change in a ray of light emitted from a light source; extract the first key from the ray of light emitted from the light source; encrypt a second key with the extracted first key to transmit the encrypted second key in short-distance communication; receive and decrypt the encrypted second key; and transfer information by use of the second key as a common key.

In the above-mentioned embodiment of the invention, a first key is publicly distributed on the basis of a change in a ray of light emitted from a light source and the first key is extracted from the received ray of light. A second key is encrypted with the extracted first key to be transmitted by short-distance communication. The encrypted second key is received and decrypted to be transferred as a common key.

In carrying out the invention and according to another embodiment thereof, there is provided an information processing apparatus. This information processing apparatus includes distributing means for distributing publicly a first key by a change in a ray of light emitted from a light source; and receiving means for receiving information encrypted with the distributed first key.

In the above-mentioned information processing apparatus, the distributing means may distribute a public key issued by a certification body as the first key.

In the above-mentioned information processing apparatus, the receiving means may receive a second key as the information encrypted with the first key, and may include decryption means for decrypting the received second key to obtain a common key.

In the above-mentioned information processing apparatus, the distributing means, arranged on an access point, may publicly distribute the first key to a client, and the receiving means, arranged on the access point, may receive the second key transmitted from the client by short-distance communication.

In the above-mentioned information processing apparatus, the distributing means may distribute the public key issued by a certification body as the first key and information indicative of certification by the certification body may be displayed on the access point.

In the above-mentioned information processing apparatus, the distributing means may further distribute an address value by a change in a ray of light emitted from the light source.

In the above-mentioned information processing apparatus, the light source may be a lighting device for lighting an object associated with information to be provided.

In the above-mentioned information processing apparatus, the access point may send a signal over a power line for controlling flashing of the lighting device.

In the above-mentioned information processing apparatus, the light source may be a light emitting diode that emits at least one of visible radiation and infrared radiation.

In carrying out the invention and according to still another embodiment thereof, there are provided an information processing method, a program, and a recording medium storing this program. The method and program each include distributing a first key by a change in a ray of light emitted from a light source; and receiving information encrypted with the distributed first key.

In the above-mentioned embodiment of the invention, a key is publicly distributed on the basis of a change in a ray of light emitted from a light source; and the information encrypted with the distributed key is received.

In carrying out the invention and according to yet another embodiment thereof, there is provided an information processing apparatus. This information processing apparatus includes receiving means for receiving a changing ray of light publicly emitted from a light source; reading means for reading a first key from the received ray of light; sending means for encrypting a second key with the read first key to send the encrypted second key by short-distance communication; and transferring means for transferring information by use of the second key as a common key.

In the above-mentioned information processing apparatus, the reading means may further read an address value from the received ray of light.

The above-mentioned information processing apparatus may further include displaying means for displaying a symbol corresponding to the address value; and deciding means for deciding whether to select the symbol.

In carrying out the invention and according to a different embodiment thereof, there are provided an information processing method, a program, and a recording medium storing this program. The method and program each include receiving a changing ray of light publicly emitted from a light source; reading a first key from the received ray of light; encrypting a second key with the read first key to send the encrypted second key by short-distance communication; and transferring information by use of the second key as a common key.

In the above-mentioned embodiment of the invention, a changing ray of light publicly emitted from a light source is received; a first key is read from the received ray of light; a second key is encrypted with the read first key to be transmitted by short-distance communication; and information is transferred by use of the second key as a common key.

As described above and according to embodiments of the present invention, information can be transmitted and received. Especially, according to embodiments of the present invention, information can be transmitted and received promptly, with little restraint, and securely.

BRIEF DESCRIPTION OF THE DRAWINGS

FIG. 21 is a block diagram illustrating an exemplary configuration of a personal computer.

DETAILED DESCRIPTION

This invention will be described in further detail by way of example with reference to the accompanying drawings. The invention described herein and the embodiments thereof have the following correlation. The description hereof is intended to make sure of the fact that the embodiments supporting the invention described herein are described herein. Therefore, if there is any embodiment that, although described in the description of the preferred embodiment, is not described herein as corresponding to the invention, this does not denote in any manner that such an embodiment does not corresponding to the present invention. Conversely, if any embodiment is described herein as corresponding to the invention, it does not denote in any manner that such an embodiment does not corresponding to other inventions than the present invention.

Figure 1:
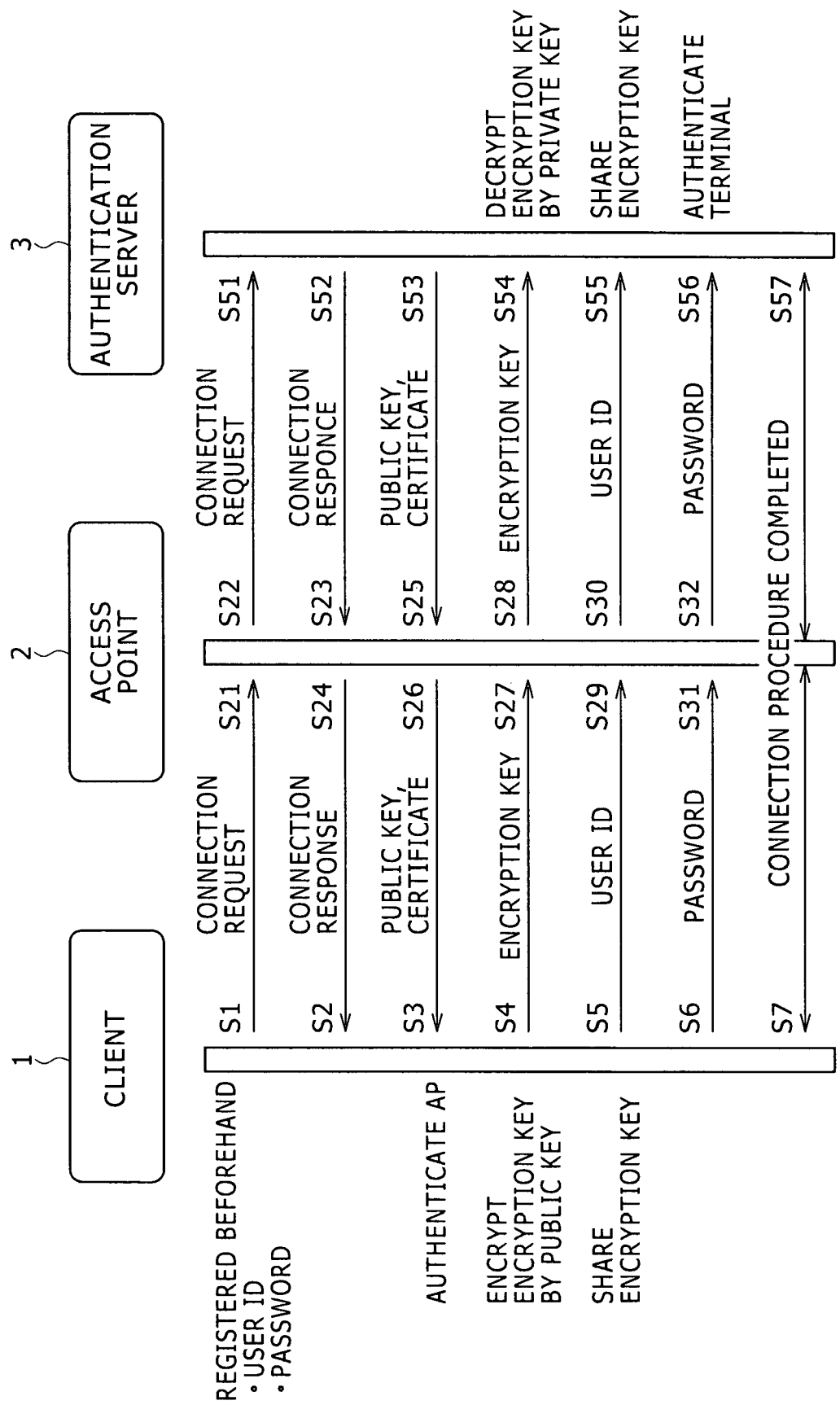
FIG. 1 is a flowchart indicative of an operation of a related-art access point.

One embodiment of the present invention is an information processing system (for example, an information providing system 1 shown in FIG. 2) or an information processing method (for example, an information processing method of the information providing system 1 shown in FIG. 1) that publicly distributes (for example, step S42 shown in FIG. 11 and step S147 shown in FIG. 19) a first key (for example, public key K1 shown in FIG. 2) by a change in a ray of light emitted from a light source (for example, a LED 32 shown in FIG. 2), extracts (for example, step S12 shown in FIG. 10 and step S108 shown in FIG. 18) the first key from the ray of light emitted from the light source, encrypts a second key (for example, encryption key K2 shown in FIG. 2) with the extracted first key to transmit (for example, step S19 shown in FIG. 10 and step S110 shown in FIG. 18) the encrypted second key in short-distance communication, receives the encrypted second key and decrypting (for example, step S78 shown in FIG. 12 and step S178 shown in FIG. 20) the received second key, and transfers (for example, step S20 shown in FIG. 10, step S111 shown in FIG. 18, step S79 shown in FIG. 12, and step S179 shown in FIG. 20) information by use of the second key as a common key.

Figure 2:
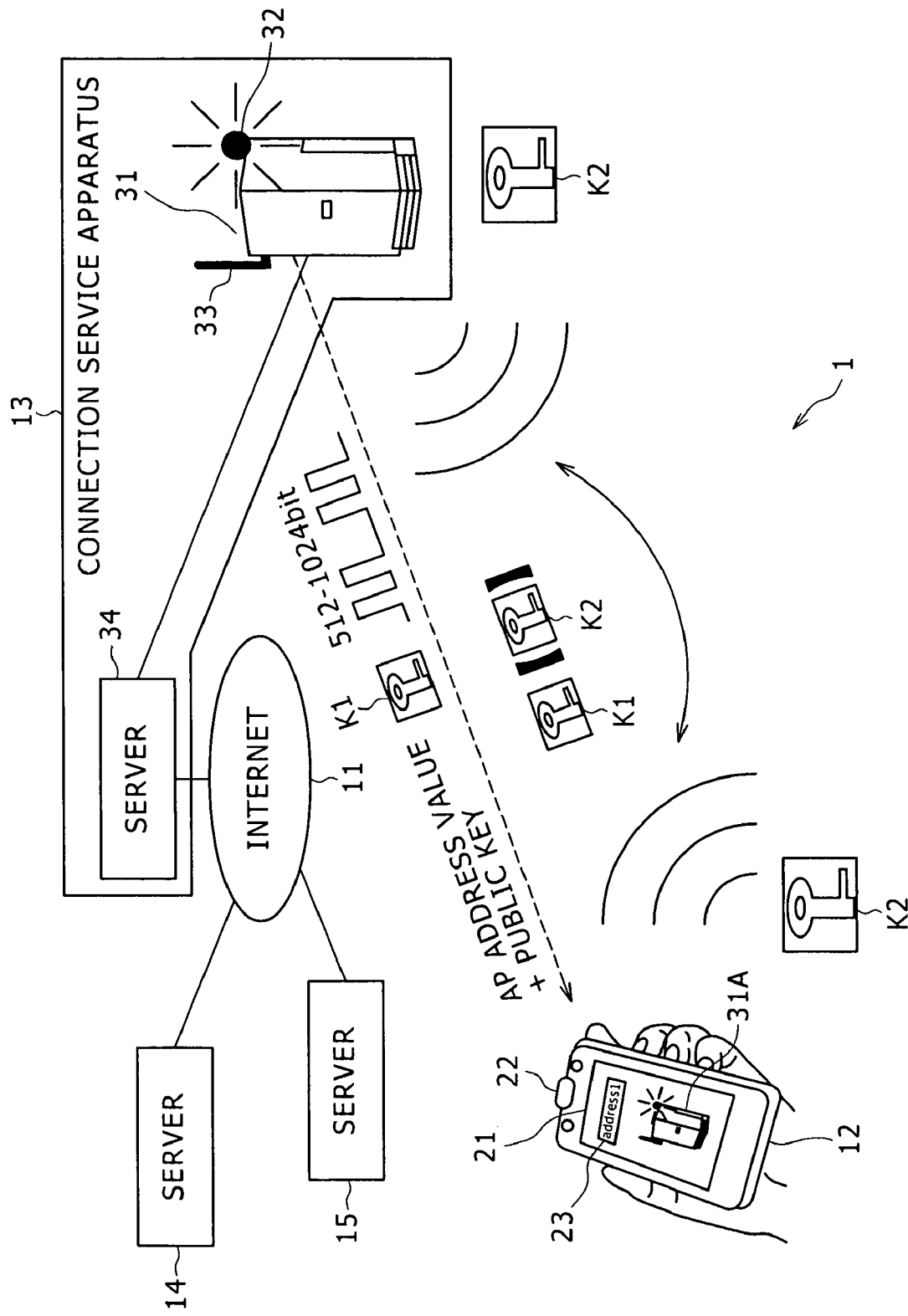
FIG. 2 is a schematic diagram illustrating an exemplary configuration of an information providing system practiced as one embodiment of the invention.

Another embodiment of the present invention is an information processing apparatus (for example, a connection service apparatus 13 shown in FIG. 2). This information processing apparatus has distributing means (for example, a sender block 122 shown in FIG. 7 for executing the processing of step S42 shown in FIG. 11 and step S147 shown in FIG. 19) for distributing publicly a first key (for example, public key K1 shown in FIG. 2) by a change in a ray of light emitted from a light source (for example, a LED 32 shown in FIG. 2) and receiving means (for example, a receiver block 121 shown in FIG. 7 for executing the processing of step S47 shown in FIG. 11 and step S146 shown in FIG. 19) for receiving information (for example, encryption key K2 shown in FIG. 2) encrypted with the distributed first key.

The above-mentioned distributing means may distribute a public key (for example, public key K1 shown in FIG. 2) issued by a certification body as the first key.

The above-mentioned receiving means may have a decryption means (a decryption block 144 shown in FIG. 8 for executing the processing of step S78 shown in FIG. 12 and step S178 shown in FIG. 20) for receiving a second key (for example, encryption key K2 shown in FIG. 2) as the information encrypted with the first key and decrypting the received second key to obtain a common key.

The above-mentioned distributing means, arranged on an access point (for example, a access point 31 shown in FIG. 2), may publicly distribute (for example, the processing of step S42 shown in FIG. 11 and step S147 shown in FIG. 19) the first key to a client (for example, a client 12 shown in FIG. 2) and the receiving means, arranged on the access point, may receive (for example, the processing of step S47 shown in FIG. 11 and step S148 shown in FIG. 19) the second key transmitted from the client by short-distance communication.

Figure 15:
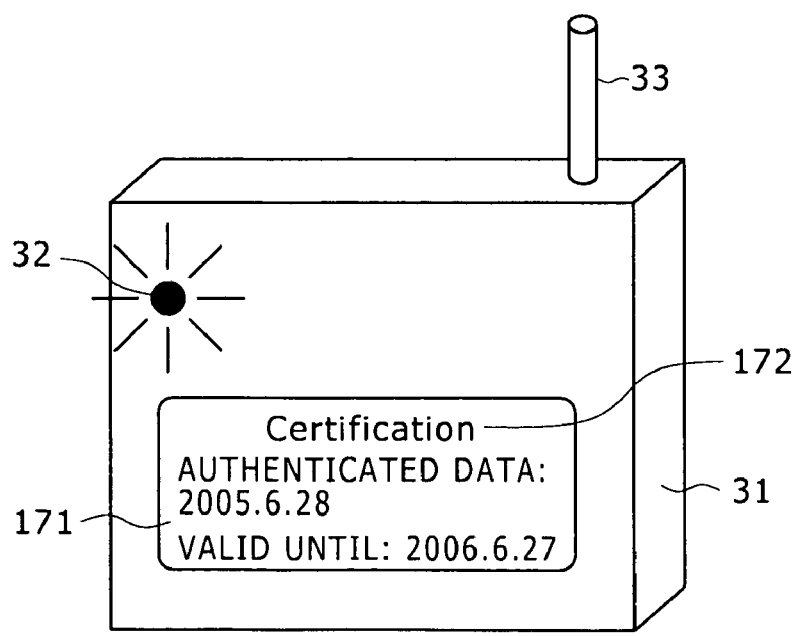
FIG. 15 is a perspective view illustrating a sample display of a symbol of certification body.

The above-mentioned distributing means may distribute the public key (for example, public key K2 shown in FIG. 2) issued by a certification body as the first key and information (for example, a notice displayed on a notice block 171 shown in FIG. 15) indicative of certification by the certification body is displayed on the access point.

The above-mentioned distributing means may further distribute (for example, the processing of step S42 shown in FIG. 11 and step S141 shown in FIG. 19) an address value by a change in a ray of light emitted from the light source.

The above-mentioned light source may be a lighting device (for example, lighting devices 202 and 203 shown in FIG. 16) for lighting an object (for example, posters 204 and 205 shown in FIG. 16) associated with information to be provided.

The above-mentioned access point may send a signal, over a power line (for example, a power line 201 shown in FIG. 16), for controlling flashing of the lighting device.

The above-mentioned light source may be a light emitting diode (for example, a LED 32 shown in FIG. 2) that emits at least one of visible radiation and infrared radiation.

Yet another embodiment of the present invention is an information processing method (for example, an information processing method for the connection service apparatus 13 shown in FIG. 2), a program, and a recording medium storing this program. These method and program have each the steps of distributing (for example, the processing of step S42 shown in FIG. 11 and step S147 shown in FIG. 19) a first key (for example, public key K1 shown in FIG. 2) by a change in a ray of light emitted from a light source (the LED 32 shown in FIG. 2) and receiving (for example, the processing of step S47 shown in FIG. 11 and step S146 shown in FIG. 19) information (for example, encryption key K2 shown in FIG. 2) encrypted with the distributed first key.

A different embodiment of the present invention is an information processing apparatus. This information processing apparatus has receiving means (for example, an imaging block 101 shown in FIG. 6 for executing the processing of step S11 shown in FIG. 10 and step S108 shown in FIG. 18) for receiving a changing ray of light publicly emitted from a light source, reading means (for example, a read block 102 shown in FIG. 6 for executing the processing of step S12 shown in FIG. 10 and step S108 shown in FIG. 18) for reading a first key (for example, public key K1 shown in FIG. 2) from the received ray of light, sending means (for example, a sender block 107 shown in FIG. 6 for executing the processing of step S19 shown in FIG. 10 and step S110 shown in FIG. 18) for encrypting a second key (for example, encryption key K2 shown in FIG. 2) with the read first key to send the encrypted second key by short-distance communication, and transferring means (for example, a transfer processing block 108 shown in FIG. 6 for executing the processing of step S20 shown in FIG. 10 and step S111 shown in FIG. 18) for transferring information by use of the second key as a common key.

The above-mentioned reading means may further read (for example, the processing of step S12 shown in FIG. 10 and step S102 shown in FIG. 18) an address value from the received ray of light.

The above-mentioned information processing apparatus may further have displaying means (for example, a display block 103 shown in FIG. 6) for displaying a symbol (for example, an icon 23 shown in FIG. 2) corresponding to the address value and deciding means (for example, a decision block 104 shown in FIG. 6 for executing the processing of step S14 shown in FIG. 10 and step S104 shown in FIG. 18) for deciding whether to select the symbol.

A still different embodiment of the present invention is an information processing method, a program, and a recording medium storing this program. These method and program each has the steps of receiving (for example, the processing of step S11 shown in FIG. 10 and step S108 shown in FIG. 18) a changing ray of light publicly emitted from a light source, reading (for example, the processing of step S12 shown in FIG. 10 and step S108 shown in FIG. 18) a first key (for example, public key K1 shown in FIG. 2) from the received ray of light, encrypting a second key (for example, encryption key K2 shown in FIG. 2) with the read first key to send (for example, the processing of step S19 shown in FIG. 10 and step S110 shown in FIG. 18) the encrypted second key by short-distance communication, and transferring (for example, the processing of step S20 shown in FIG. 10 and step S111 shown in FIG. 18) information by use of the second key as a common key.

The following describes embodiments of the present invention with reference to accompanying drawings.

Referring to FIG. 2, there is shown an exemplary configuration of an information providing system as an information processing system practiced as one embodiment of the invention. The information providing system 1 is made up of the Internet 11, a client 12, a connection service apparatus 13, and servers 14 and 15. Referring to FIG. 2, there is shown only one client 12. To one access point 31, a plurality of clients 12 can be connected. The required number of access points can be arranged at required places in a distributed manner.

The client 12 that is a PDS (Personal Digital Assistant) has an LCD (Liquid Crystal Display) 21. The LCD 21 display necessary images from time to time. A camera 22 of the client 12 takes a picture of a subject and displays the taken picture on the LCD 21.

The connection service apparatus 13 is made up of the access point 31 and a server 34. The access point 31 has a LED (Light Emitting Diode) 32 that transmits an optical signal by flashing a ray of light (visual infrared) and an antenna 33 for use in wireless short-distance communication. The access point 31 and the server 34 are interconnected in a wired or wireless manner. The server 34 is also connected to the Internet 11. The Internet 11 is further connected to the servers 14 and 15 that provide various kinds of information.

It should be noted that the short-distance communication between the client 12 and the access point may be supported by any one of standards IEEE (Institute of Electrical and Electronic Engineers) 802.11b/a/g, UWB (Ultra Wide Band), Bluetooth (trademark), and ZigBee, for example. The term "short-distance communication" as used herein denotes the communication executed within a distance range in which a signal generated by the change in a ray of light can be received and decoded. To be more specific, the short-distance communication denotes wireless communication that is executed within a distance range of several meters to several tens of meters.

Although a detail operation will be described later with reference to FIGS. 9 and 11, the LED 32 of the access point 31 sends the address and public key K1 of the access point 31 by flashing a ray of light. This public key K1 is issued to the administrator of the connection service apparatus 13 by a predetermined certification body along with a corresponding private key or uniquely generated by an access point enterprise. The client 12 takes an image of this access point 31 with the camera 22 and displays the taken image on the LCD 21. The user specifies an icon 23 indicative of the presence of the access point that issued public key K1, thereby executing access point selection. Upon extraction of public key K1 from the received image, the client 12 encrypts encryption key K2 generated by the client 12 and sends the encrypted encryption key to the access point 31 by radio wave (namely, short-distance communication).

The access point 31 transfers encryption key K2 encrypted by public key K1 to the server 34. Consequently, the server 34 can share encryption key K2 with the client as a common key and use the shared key when transferring information between server and client.

Figure 3:
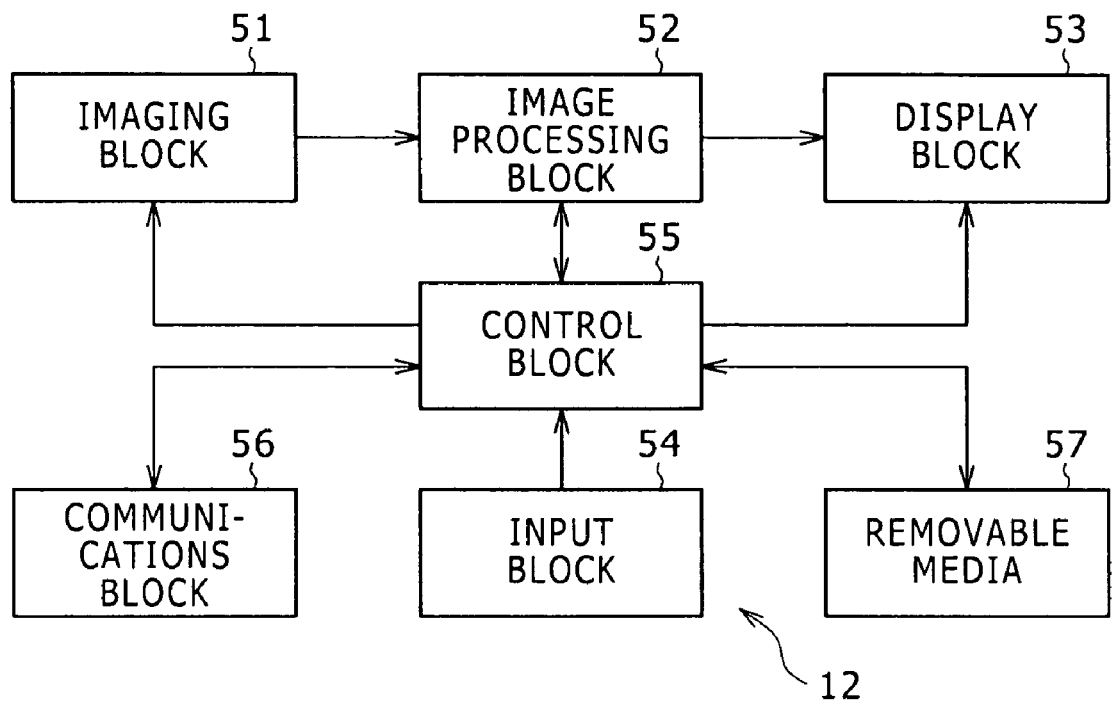
FIG. 3 is a block diagram illustrating an exemplary configuration of a client.

Referring to FIG. 3, there is shown an exemplary configuration of the client 12. An imaging block 51, corresponding to the camera 22, takes an image of a subject and outputs a corresponding image signal. An image processing block 52 processes the received image signal from the imaging block 51 and outputs the processed image signal to a display block 53, thereby displaying the processing signal. The display block 53 corresponds to the LCD 21.

A control block 55, based on a microcomputer for example, controls operations of the imaging block 51, the image processing block 52, the display block 53, and other blocks. An input block 54, made up of switches, buttons, and other controls, outputs signals corresponding to user operations done on the input block to the control block 55. A communications block 56 executes radio communication with the access point 31.

A removable media 57, load on the client 12 as required, supplies programs and data necessary for the operations of the client to the control block 55.

Figure 4:
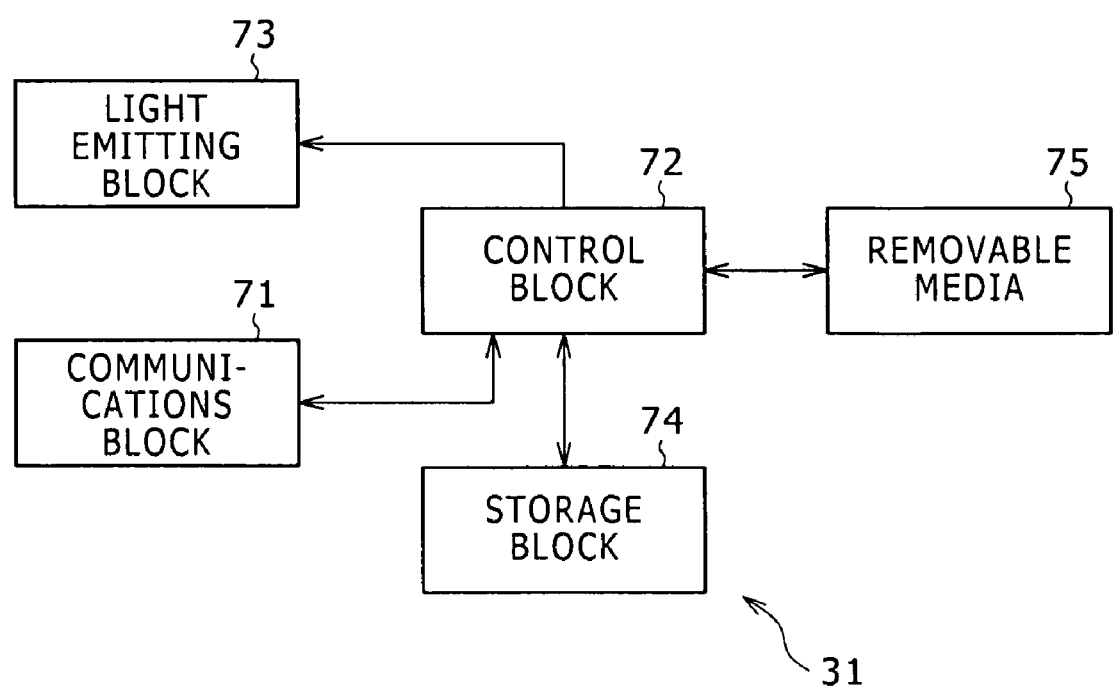
FIG. 4 is a block diagram illustrating an exemplary configuration of an access point.

Referring to FIG. 4, there is shown an exemplary configuration of the access point 31. A light emitting block 73, corresponding to the LED 32, is controlled by a control block 72 to output signals by changing the levels of light (for example, this block outputs a light flash signal). A communications block 71 executes wireless communication with the client 12 via the antenna 33. The communications block 71 also executes communication with the server 34. A storage block 74 stores the address and public key K1 to be transmitted to the client 12.

For example, the control block 72 based on a microcomputer for example is connected to a removable media 75. The removable media 75 stores programs and data necessary for the control block 72 to operate.

Figure 5:
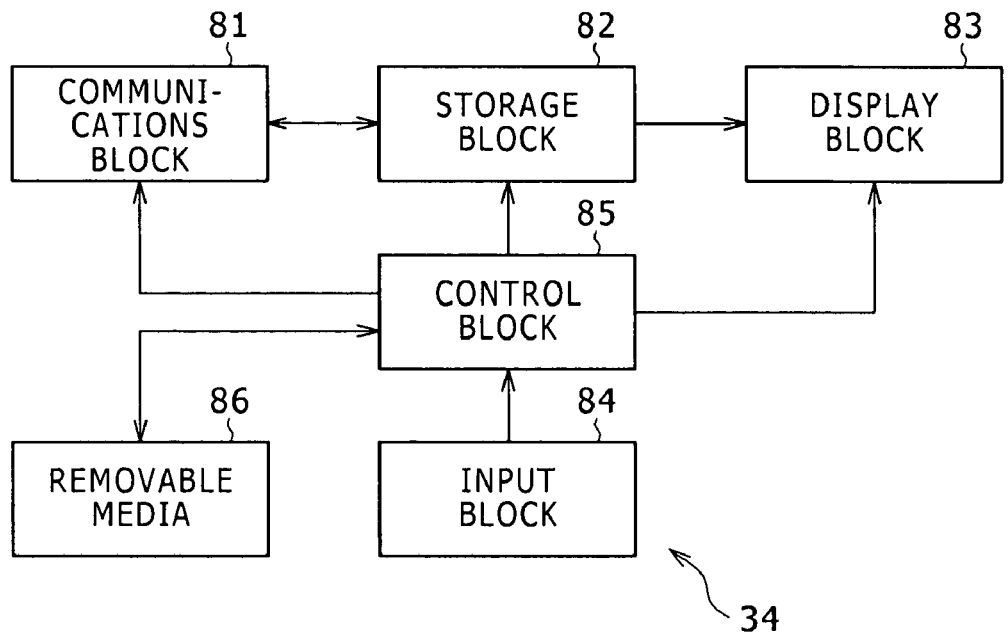
FIG. 5 is a block diagram illustrating an exemplary configuration of a server.

Referring to FIG. 5, there is shown an exemplary configuration of the server 34. A communications block 81 executes communication with other units via the access point 31 and the Internet 11. A storage block 82 stores a public key for example to be supplied to the access point 31. The displayed block 83 displays necessary images and information. A control block 85, based on a microcomputer for example, controls operations of other blocks of the server. An input block 84, based on a keyboard, a mouse, and so on, supplies signals corresponding user operations done on the input block 84 to the control block 85.

A removable media 86, connected to the server 34 as required, supplies programs and data thereto from time to time.

Figure 6:
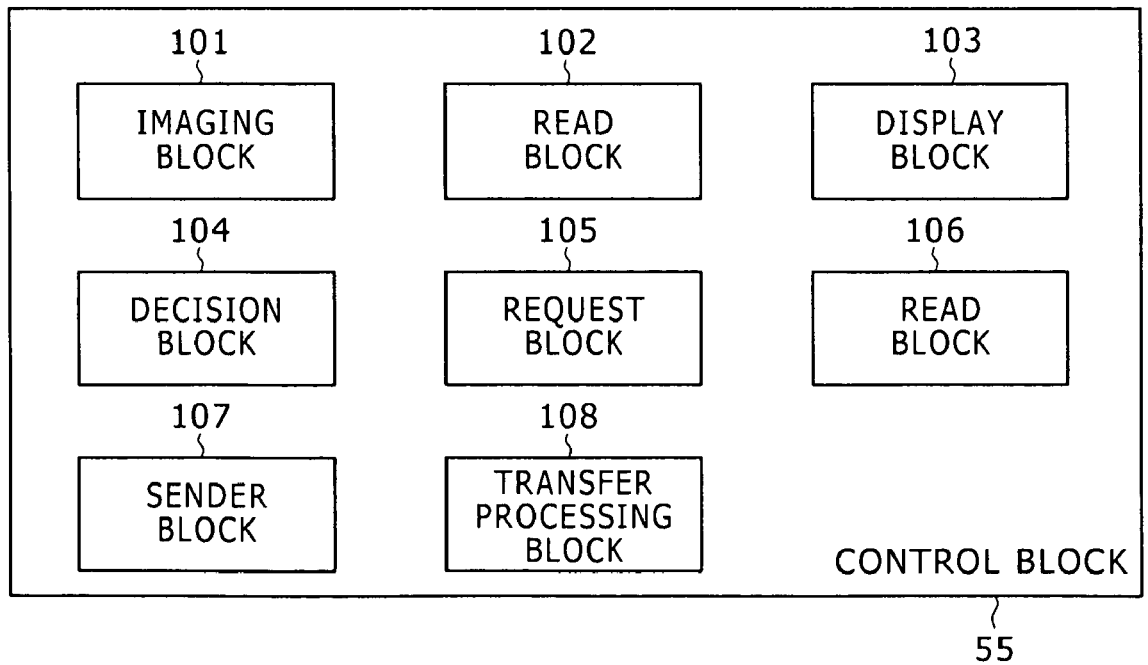
FIG. 6 is a block diagram illustrating an exemplary functional configuration of a control block of the client.

The control block 55 of the client 12 has a functional configuration as shown in FIG. 6. Although not shown, each of the component blocks of the control block 55 is enabled to transmit and receive signals with other component blocks. The same holds with the configurations shown in FIGS. 7 and 8.

A imaging block 101 takes an image of a subject. A read block 102 reads an address value and a public key from the taken image. A display block 103 controls display of an image on the display block 53. A decision block 104 executes various decisions. A request block 105 requests the access point for connection. A read block 106 reads out an encryption key. A sender block 107 sends an encryption key encrypted by a public key to the access point 31. A transfer processing block 108 transfers information with the servers 14 and 15 via the access point 31 and the server 34.

Figure 7:
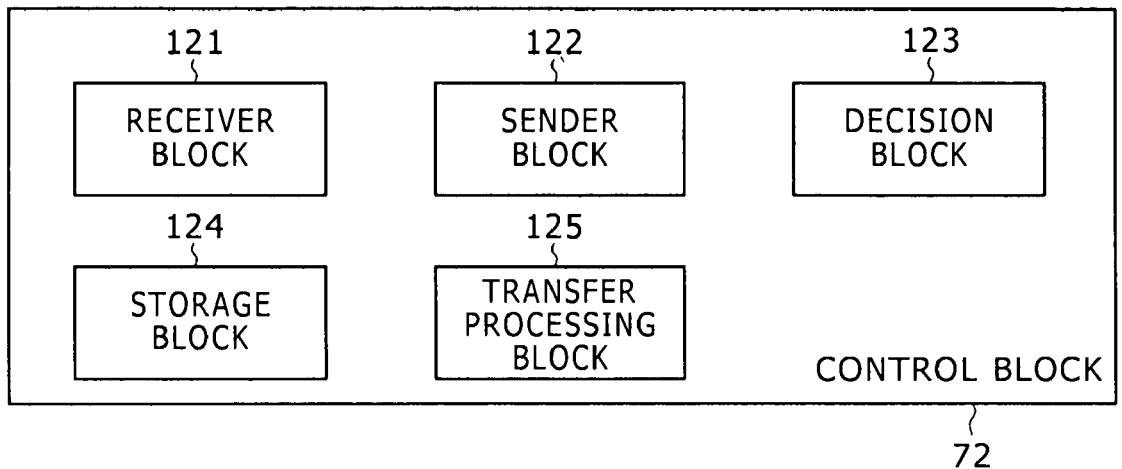
FIG. 7 is a block diagram illustrating an exemplary functional configuration of a control block of the access point.

Referring to FIG. 7, there is shown a functional configuration of the control block 72 of the access point 31. A receiver block 121 receives a public key from the server 34. A sender block 122 sends the address value and public key, a connection request to the server 34, and a connection response to the client 12. Also, the sender block 122 sends an encryption key to the server 34. A decision block 123 executes various decisions. A storage block 124 stores the address value and public key. A transfer processing block 125 transfers information between the client 12 and the server 34.

Figure 8:
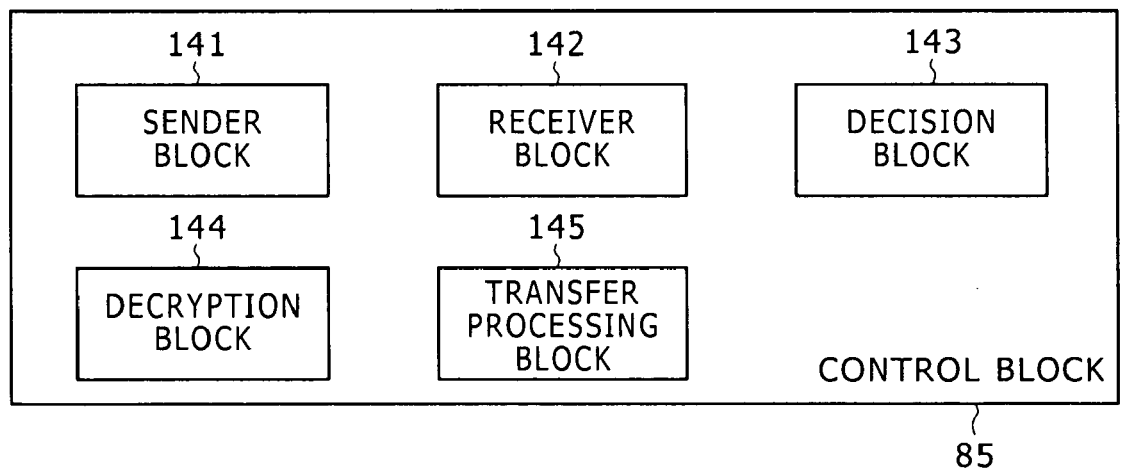
FIG. 8 is a block diagram illustrating an exemplary functional configuration of a control block of the server.

Referring to FIG. 8, there is shown a functional configuration of the control block 85 of the server 34. A sender block 141 sends a public key to the access point 31 and a connection response to the access point 31. A receiver block 142 receives a connection response from the access point 31. A decision block 143 executes various decisions. A decryption block 144 decrypts an encryption key with a private key. A transfer processing block 145 transfers information between the access point 31 and the servers 14 and 15.

Figure 9:
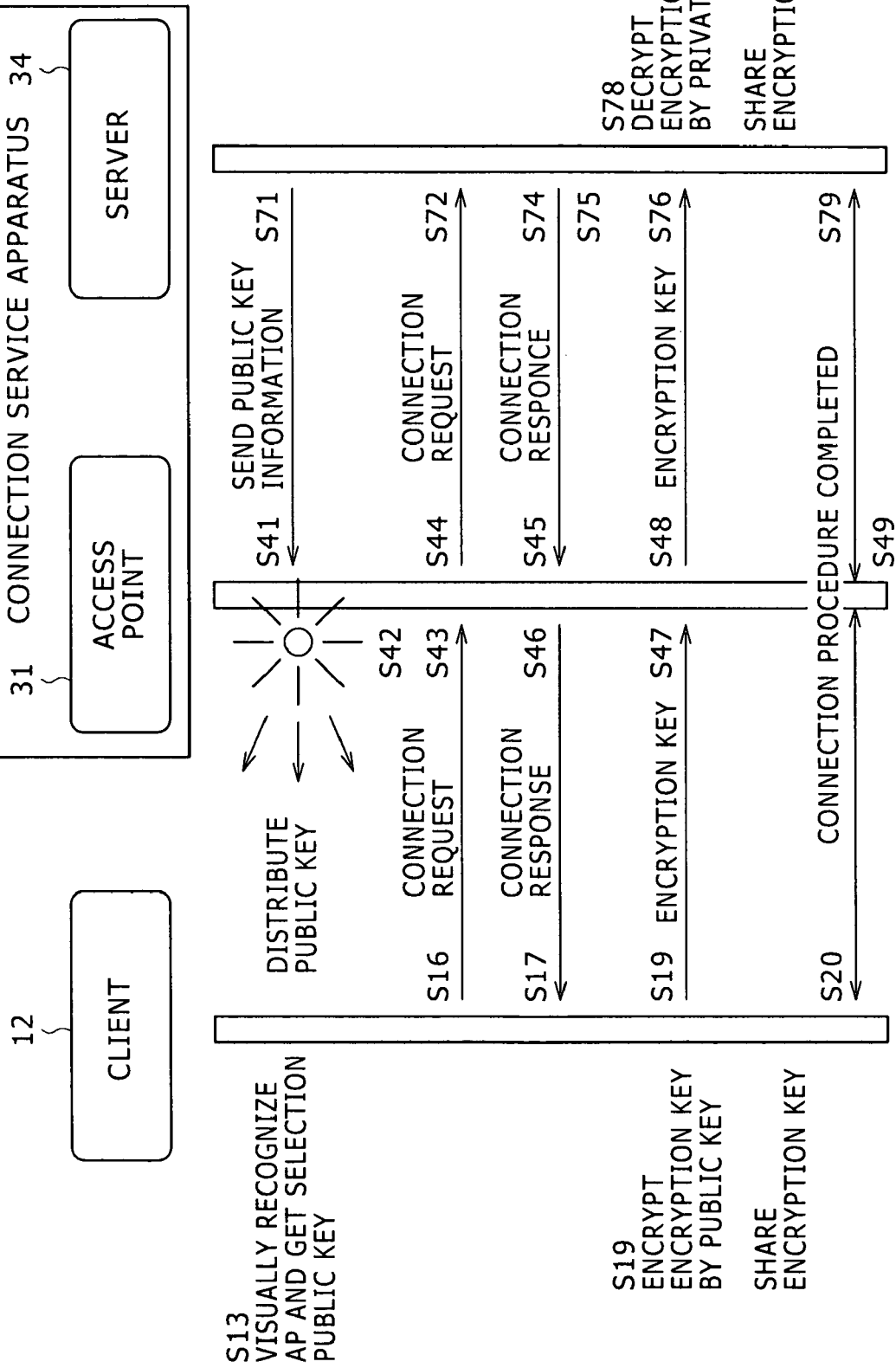
FIG. 9 is a flowchart indicative of an operation of the information providing system shown in FIG. 2.
Figure 10:
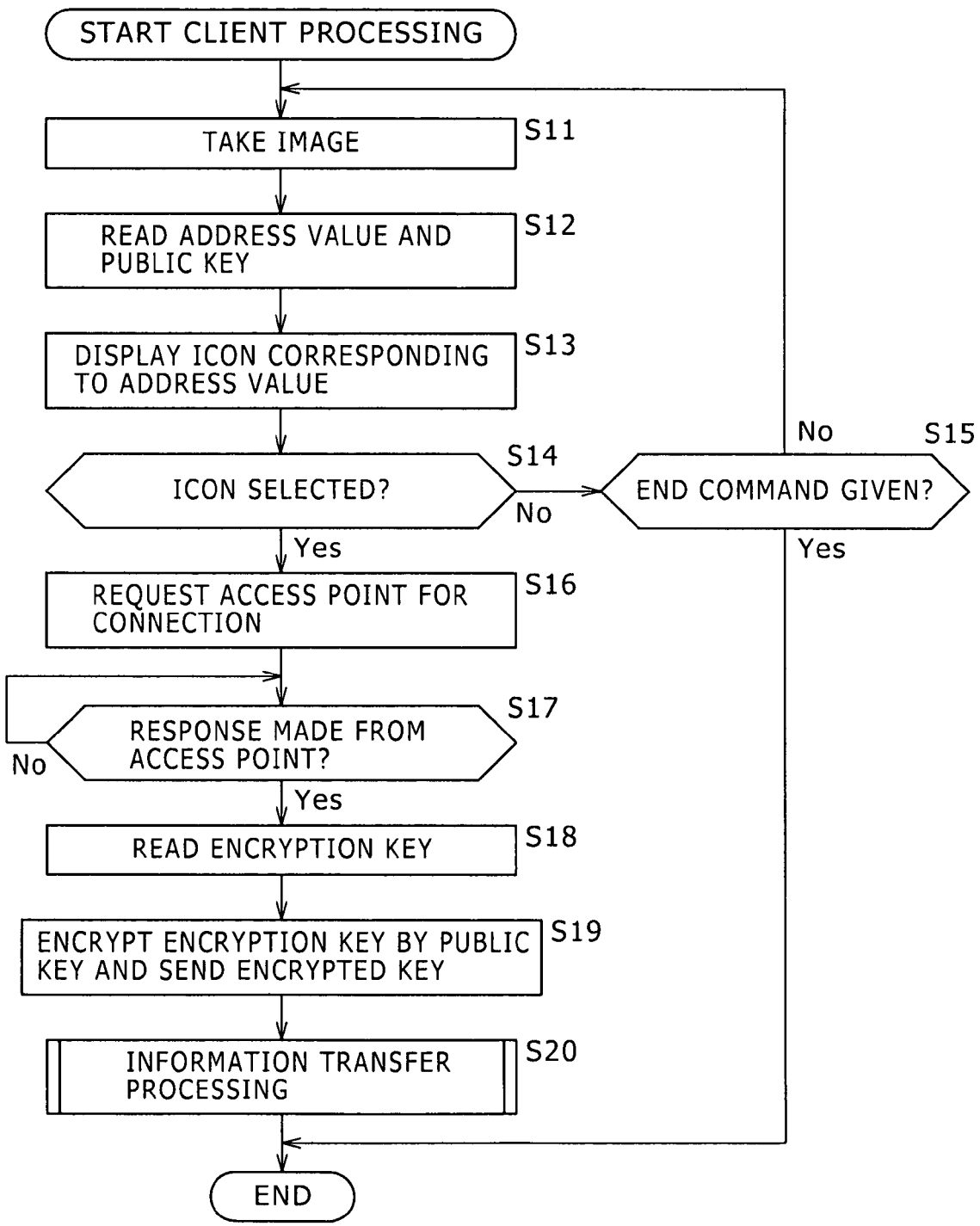
FIG. 10 is a flowchart indicative of processing by the client.
Figure 11:
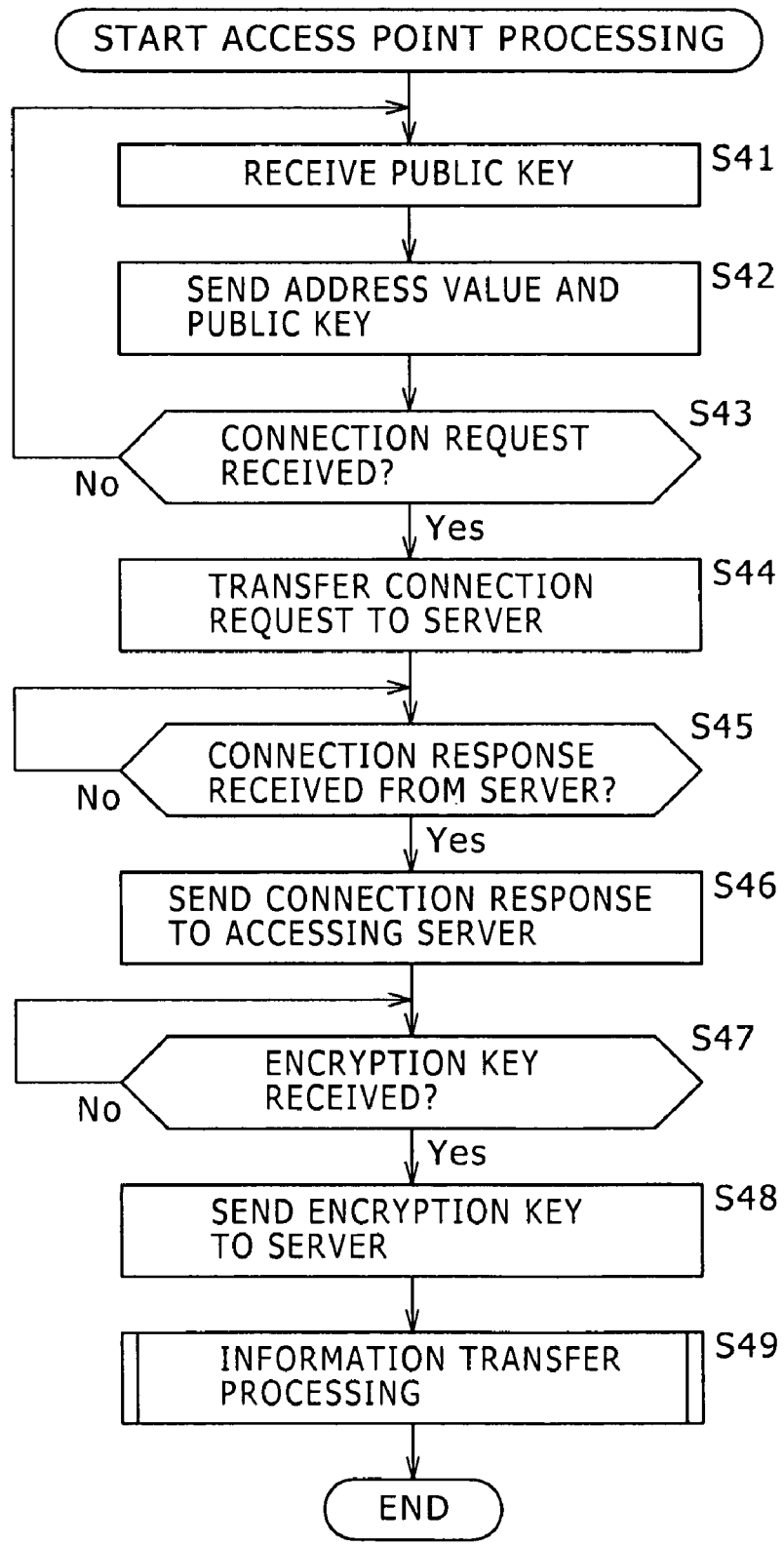
FIG. 11 is a flowchart indicative of an operation of the access point.
Figure 12:
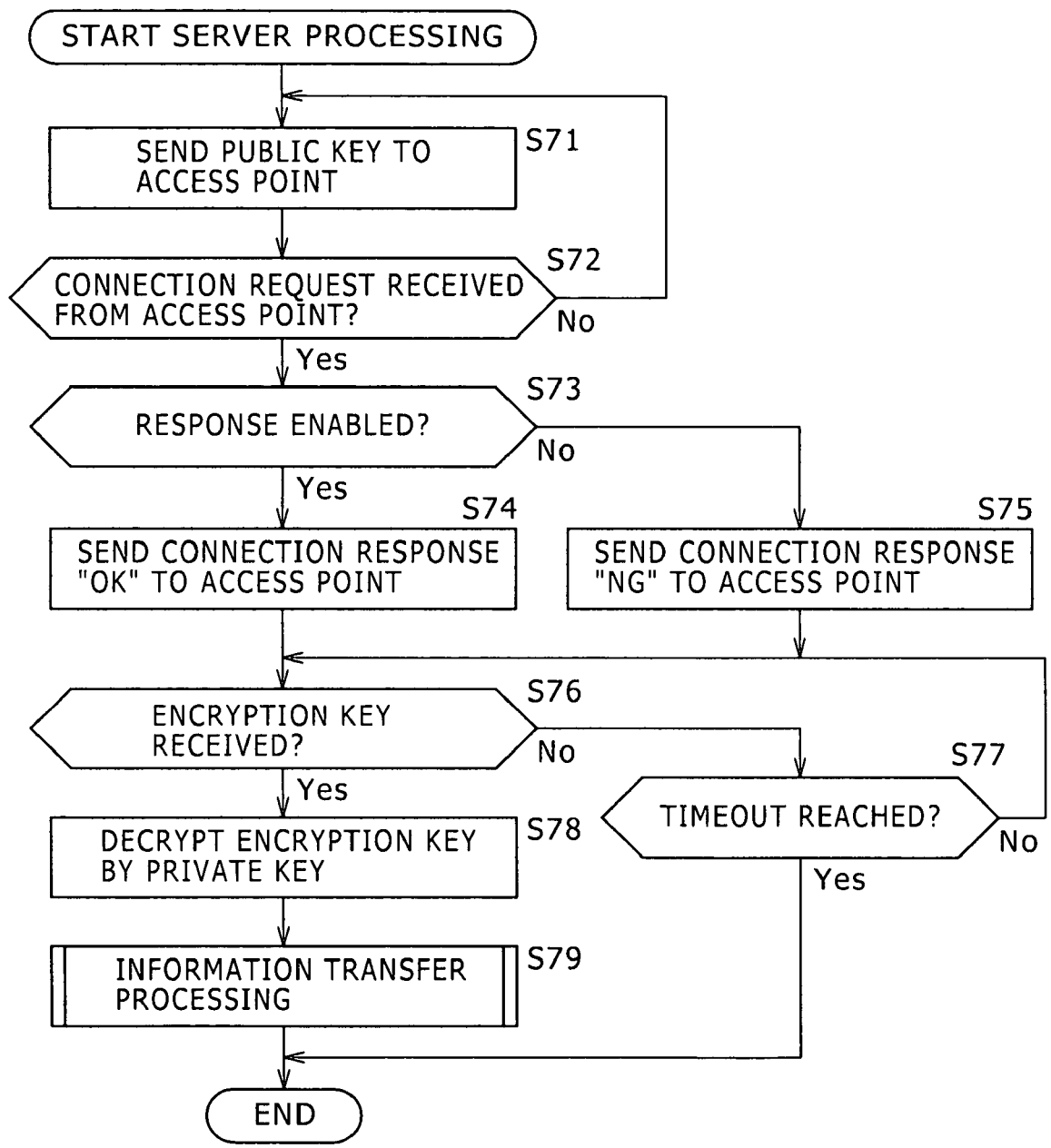
FIG. 12 is a flowchart indicative of an operation of the server.

The following describes processing to be executed when the client 12 connects to server 34 via the access point 31 to get required information from the servers 14 and 15 via the Internet 11 with reference to flowcharts shown in FIGS. 9 through 12. FIG. 9 shows an overall operation of the client 12, the access point 31, and the server 34. FIG. 10 shows an operation of the client 12. FIG. 11 shows an operation of the access point 31. FIG. 12 shows an operation of the server 34.

In step S71, the sender block 141 of the server sends a public key to the access point. To be more specific, the communications block 81 reads a public key from the storage block 82 and sends the public key to the access point 31.

In step S41, the receiver block 121 of the access point 31 receives the public key. In step S42, the sender block 141 sends the public key received in step S41 to the client 12 along with an address value.

To be more specific, the control block 72 of the access point 31 sends (or broadcasts) the public key received at the communications block 71 from the server 34 and the address value stored beforehand (namely, the address value by which to access the access point 31) read from the storage block 74 by controlling the light emitting block 73 as a light flash signal.

Figure 13:
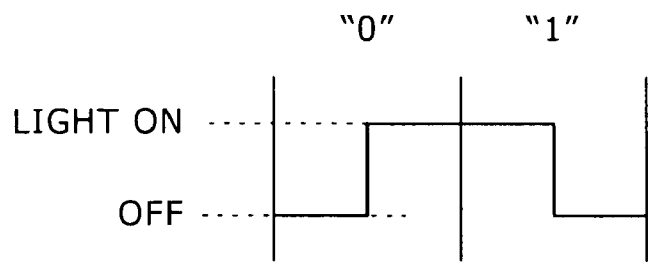
FIG. 13 is a diagram illustrating "0" and "1" in Manchester encoding.
Figure 14:
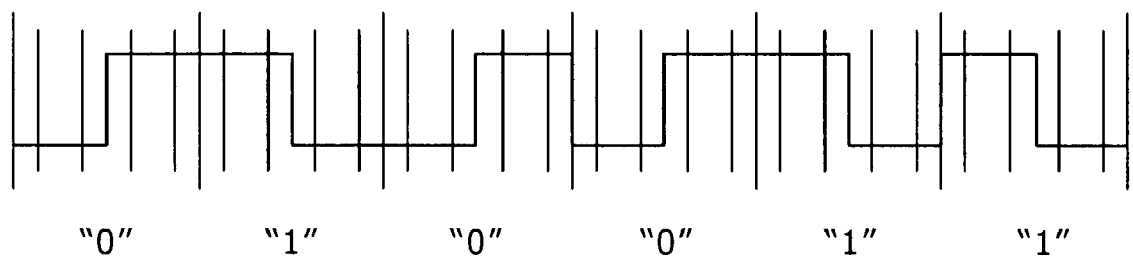
FIG. 14 is a diagram illustrating an example of data encoding sequence.

The signal to be transmitted is Manchester-encoded as shown in FIG. 13. In Manchester encoding, the rising edge (indicative of the status transition from off of the LED 32 to on thereof) is "0" and the falling edge (indicative of the status transition from on of the LED to off thereof) is "1". Consequently, as shown in FIG. 14 for example, a data code sequence such as "010011" for example is transmitted as a light flash signal (obviously, the off status of the LED 32 does not necessarily means no emission of light; namely, there may only be a significant difference between the high and low levels of light, thereby allowing the photo receiver side to fully recognize the difference).

As described above, by flashing the LED 32, the access point 31 always broadcasts the address value and the public key of the access point 31 (namely, the access point 31 distributes the address value and the public key of the access point 31 in a public manner).

Then, the user directs the camera 22 of the client 12 toward the access point 31 to access and operates the input block 54 to give a command to take an image of the access point 31 to access. At this moment, the imaging block 101 executes imaging processing in step S11. To be more specific, the access point 31 is taken an image of by the imaging block 51 and a result image signal is processed by the image processing block 52 to be outputted to and displayed on the display block 53 (the LCD 21).

Since the ray of light travels in a rectilinear manner, only the access point 31 to which the camera 22 is directed is taken an image of; therefore, if there is any other access points to which the camera 22 is not directed, these access points will not be taken an image of. Consequently, there is little possibility for the user to receive the light from any unwanted access point, thereby minimizing the risk of falling victim to phishing.

If an access point enterprise uses a public key issued from a predetermined certification body, a symbol 172 (word "Certification" in an example of FIG. 15) is shown on a notice block 171 of the access point 31 as information indicative that this access point 31 was certified by a predetermined certification body as shown in FIG. 15, for example. In addition to the symbol 172, the notice block 171 shows the date of certification "2005.6.28" for example and the date of expiration of certification "2006.6.27" for example. Therefore, the user can check the symbol 172 and the dates of certification and expiration of certification from the displayed image to recognize that the access point 31 is a properly certified access point. This arrangement also enhances the security of the system.

The read block 102 reads (or extracts) the address value and the public key from the flash signal by analyzing the image taken by the imaging block 101 (namely, decoding the flash signal or the Manchester code) in step S12. Next, in step S13, the display block 103 displays, on the LCD 21, an icon that is the symbol corresponding to the address value read (or extracted) in step S12. Consequently, as shown in FIG. 2 for example, address "address 1" corresponding to the access point 31 is displayed in the vicinity of image 31A of the access point 31, as the icon 23 on the LCD 21.

By this address (or icon), the user rechecks that this access point is one that is desired by the user and clicks the icon with the his finger for example, thereby specifying the access point to access. In step S14, the decision block 104 determines whether the icon has been selected by the user. If the icon is found not selected, then the decision block 104 determines in step S15 whether the end of processing has been specified by the user. If the end of processing is found not specified, the procedure returns to step S11 to repeat the above-mentioned processing therefrom. Namely, until the icon 23 is clicked for selection, the processing in steps 11 through 15 is repeated.

If the icon 23 is clicked by the user, then the request block 105 requests the access point for connection in step S16. Namely, under the control of the control block 55, the communications block 56 sends a connection request signal to the access point 31 by short distance communication in a wireless manner.

In step S43, the decision block 123 determines whether the access point 31 has received the connection request. If the connection request has not been received by the receiver block 121, the procedure returns to step S41 to repeat the above-mentioned processing therefrom.

If the connection request is found received by the receiver block 121 in step S43, then the sender block 122 transfers the connection request to the server in step S44. Namely, the communications block 71 of the access point 31 sends the connection request received from the client 12 to the server 34.

In the server 34, the decision block 143 determines in step S72 whether the connection request has been received from the access point. If the connection request is found not received, then the procedure returns to step S71 to repeat the above-mentioned processing of steps S71 and S72 until the connection request is received.

If the connection request is found received from the access point 31, then the decision block 143 determines in step S73 whether a response to the connection request is enabled or not. Namely, it is determined whether the response is difficult or not because the access point is requested for access by too many clients. If the response is enabled, then the sender block 141 sends connection response "OK" to the access point in step S74. If the response is found disabled in step S73, then the sender block 141 sends connection response "NG" to the access point in step S75.

In step S45, the decision block 123 of the access point 31 determines whether the connection response has been received from the server 34 and waits until the connection response is received. If the connection response is found received from the server 34, then the sender block 122 sends the received connection response to the accessing client in step S46.

The decision block 104 of the client 12 determines whether a response has come from the access point in step S17 and waits until the response comes. If a response is found received from the access point 31, then the read block 106 reads an encryption key in step S18. This encryption key may be one already generated or one that is generated by the read block 106 as required.

In step S19, the sender block 107 encrypts the encryption read in step S18 by use of the public key and sends the encrypted encryption key. Namely, the encryption key read in step S18 is encrypted by the public key read in step S12 and the encrypted encryption key is sent to the access point 31.

In step S47, the decision block 123 of the access point 31 determines whether the encryption key has been received and waits until the encryption key is received. When the encryption key is received, then, in step S48, the sender block 122 sends the encrypted key received in step S47 to the server 34.

In step S76, the decision block 143 of the server 34 determines whether the encryption key has been received. If the encryption key is found not received, then the decision block 143 determines in step S77 whether timeout has been reached. Namely, after transmitting the connection response in steps S74 and S75, it is determined whether a preset time has passed. If a preset time is found not passed, then the procedure returns to step S76 to repeat the above-mentioned processing therefrom. If a preset time is found passed, then the above-mentioned processing comes to an end.

If the encryption key is found received in step S76, then the decryption block 144 decrypts the encryption key with the private key in step S78. Namely, the encryption key received at the receiver block 142 in step S76 is decrypted by use of the private key corresponding to the public key transmitted in step S71. Consequently, the encryption key is shared between the client 12 and the server 34 as a common key.

Therefore, in step S79, the transfer processing block 145 and, in step S20, the transfer processing block 108 and, in step S49, the transfer processing block 125 each execute information transfer processing. To be more specific, the transfer processing block 108 of the client 12 sends necessary information to the access point 31 in step S20. The transfer processing block 125 of the access point 31 transfers a signal supplied from the client 12 to the server 34 in step S49. The transfer processing block 145 of the server 34 accesses the server for example through the Internet 11 on the basis of the access information supplied from the client 12 through the access point 31, thereby connecting to the server 14 in step S79.

Data, such as a home page, transmitted from the server 14, is received at the transfer processing block 145 of the server 34 through the Internet 11 and then sent to the access point 31 in step S79. Receiving the data from the server 34 in step S49, the transfer processing block 125 of the access point 31 transfers the received data to the client 12. In step S20, the transfer processing block 108 of the client 12 outputs the data received from the server 14 through the server and the access point 31 to the LCD 21 for example, thereby displaying the data on the LCD 21.

As described above, the user need not have ID and password, so that the registration beforehand is not necessary. Without the registration beforehand, the user can access the Internet 11 from the server 34 through the access point 31 as needed. Therefore, the user can access the predetermined servers 14 and 15 through the Internet 11 promptly and with little restraint at any place (in the vicinity of the access point 31), thereby getting the provision of desired information. This configuration also allows information providers to arrange access points at desired places, thereby providing information promptly and with little restraint.

In addition, the address value and the public key detected from an image actually taken of the flashing LED 32 by the user are used, so that it is difficult to fall victim to attempts of wireless LAN phishing by picking up unauthorized radio generated at a hidden place. Therefore, the above-mentioned novel configuration allows the secure transfer of information.

Further, the communication between the client 12 and the server 34 through the access point 31 is encrypted with encryption key K2, thereby ensuring secrecy.

It should be noted that, in the above-mentioned configuration, the access point 31 and the server 34 making up the connection service apparatus 13 are arranged at positions away from each other; it will be apparent that the access point 31 and the server 34 may also be formed in a unified manner.

Figure 16:
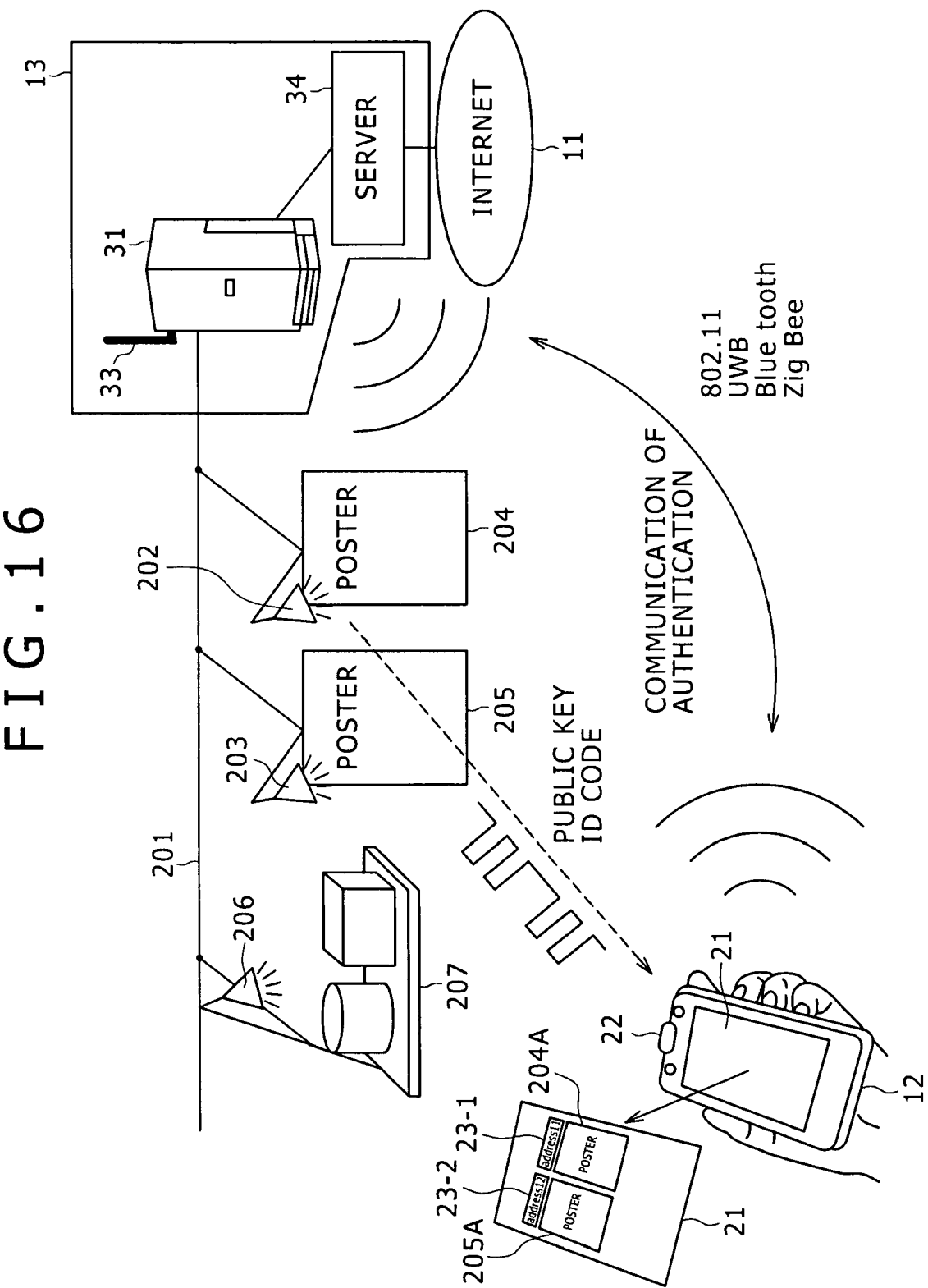
FIG. 16 is a schematic diagram illustrating an exemplary configuration of another embodiment of the invention.
Figure 17:
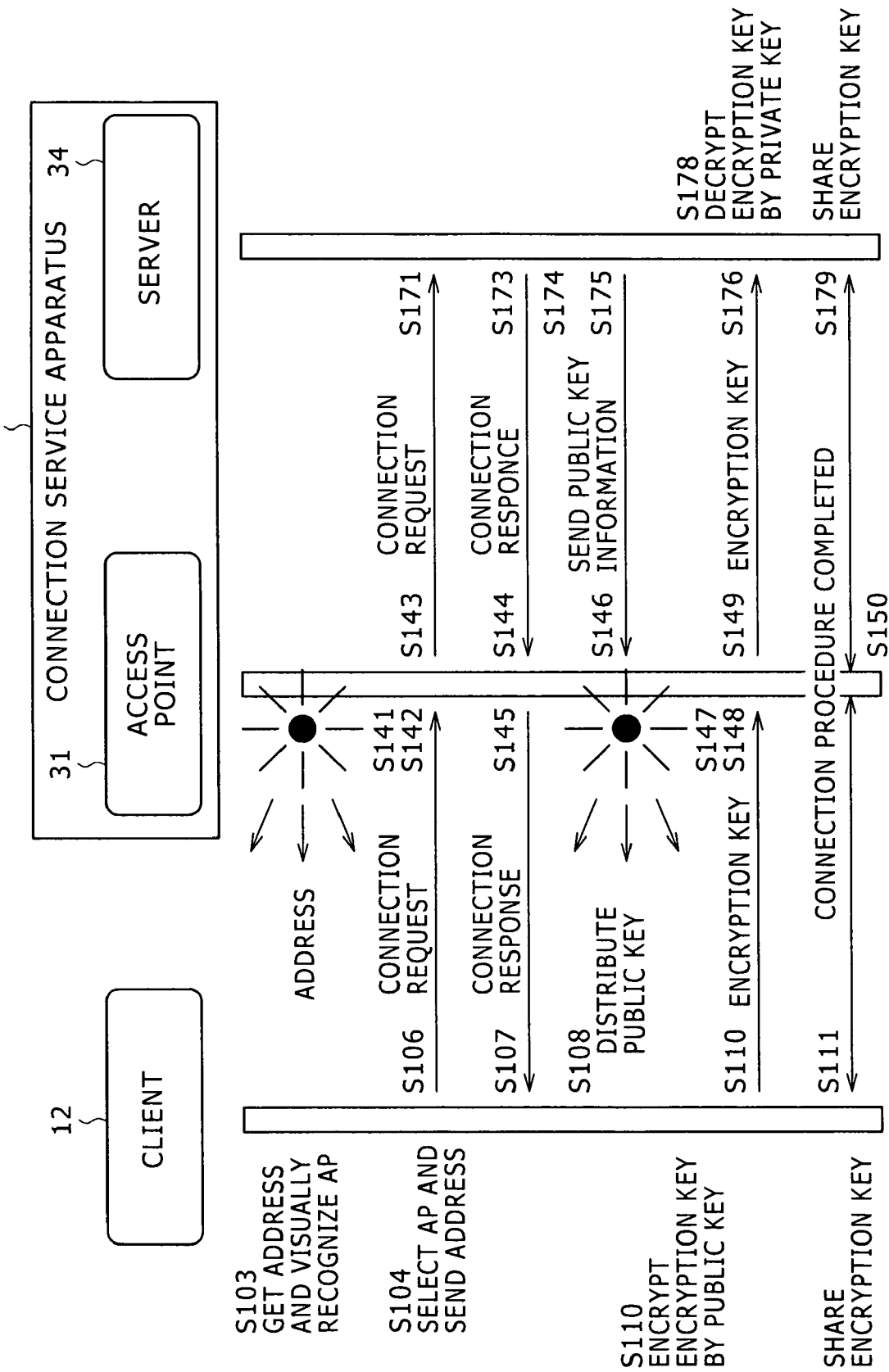
FIG. 17 is a flowchart indicative of processing by the embodiment shown in FIG. 16.

In the above-mentioned configuration, the LED 32 functioning as a light source and the access point 31 are integrally arranged. It is also practicable to arrange the light source and the access point 31 at separate positions. FIG. 16 shows an embodiment in which this arrangement is used. To be more specific, in this embodiment, a lighting device 202 based on a LED is lighting a poster 204 and a lighting device 203 based on LED is lighting a poster 205. A lighting device 206 based on LED is lighting a display shelf 207 display various items of products. The lighting devices 202, 203, and 206 are supplied with necessary power over a power line 201. The access point 31 is also connected to this power line 201. The access point 31 controls the lighting devices 202, 203, and 206 through the power line 201, thereby flashing these devices.

In the embodiment shown in FIG. 16, the posters 204 and 205 are taken by the camera 22 of the client 12. Therefore, an image 204A of the poster 204 and the 205A of the poster 205 are displayed on the LCD 21 along with icons 23-1 and 23-2 corresponding thereto. The user selects one of these icons with his finger or the like.

In this case, the lighting device 202 provides a URL (Uniform Resource Locator) for providing information associated with the poster 204 by means of a flash signal generated by the lighting device 202. The lighting device 203 also provides an URL associated with the poster 205 by means of a flash signal generated by the lighting device 203. The lighting device 206 provides an URL for providing the information associated with products displayed on the display shelf 207 by means of a flash signal generated by the lighting device 206.

FIGS. 17 through 20 illustrate operations of still another embodiment. In this embodiment, an access point 31 is normally broadcasting only an address thereof and transmits a public key when at least one of clients accesses the access point 31. Other processing is basically the same as that described above with reference to FIGS. 9 through 12.

Figure 20:
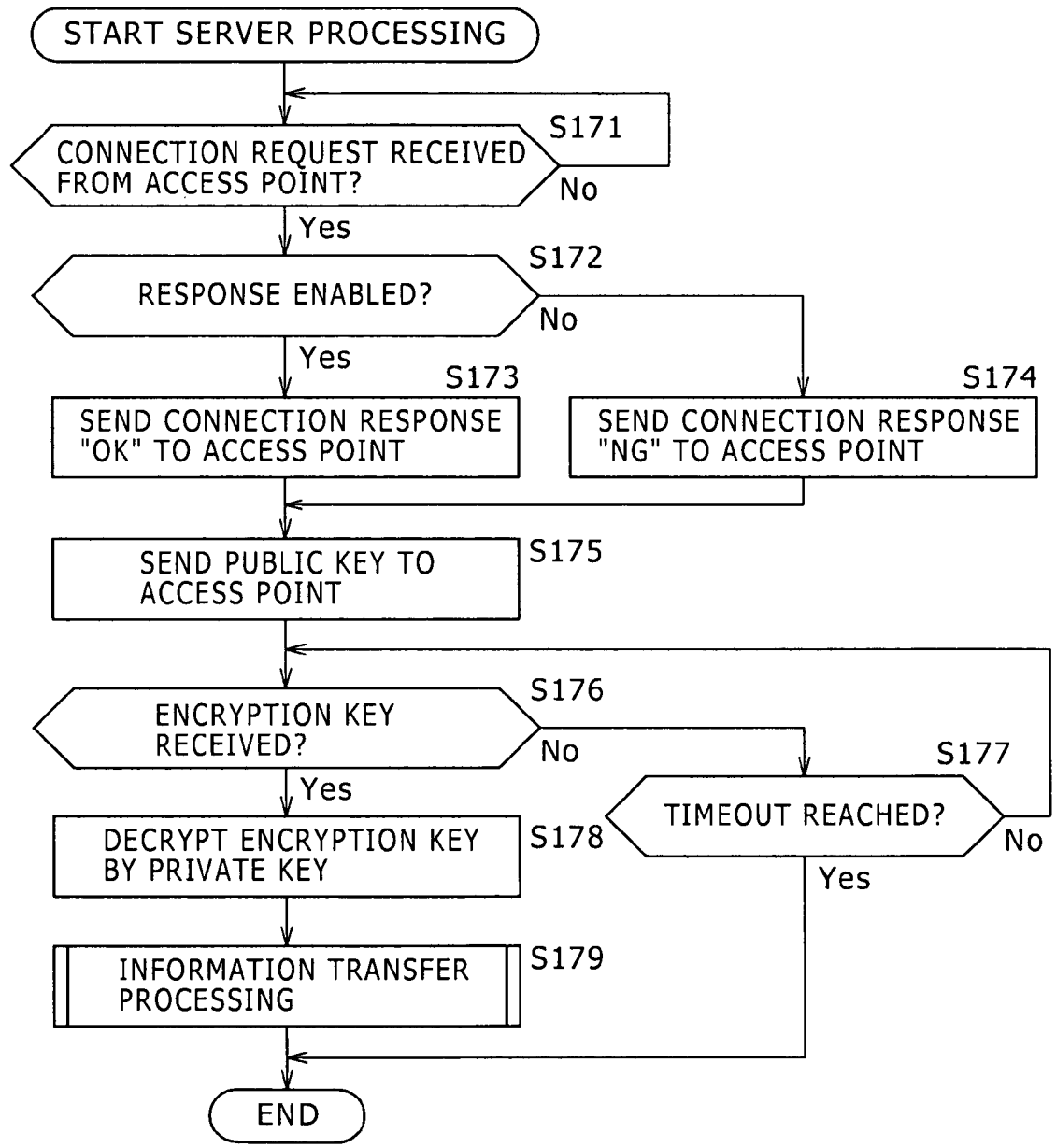
FIG. 20 is a flowchart indicative of processing by the server.

To be more specific, of the processing of steps S171 through 5179 corresponding to steps S71 through S79 shown in FIG. 12, the processing of sending a public key to an access point executed in step S71 shown in FIG. 12 is executed in step S175 next to the sending of a connection response to an access point of steps S173 and S174 in the embodiment shown in FIG. 20. The other processing is substantially the same as that shown in FIG. 12.

Figure 19:
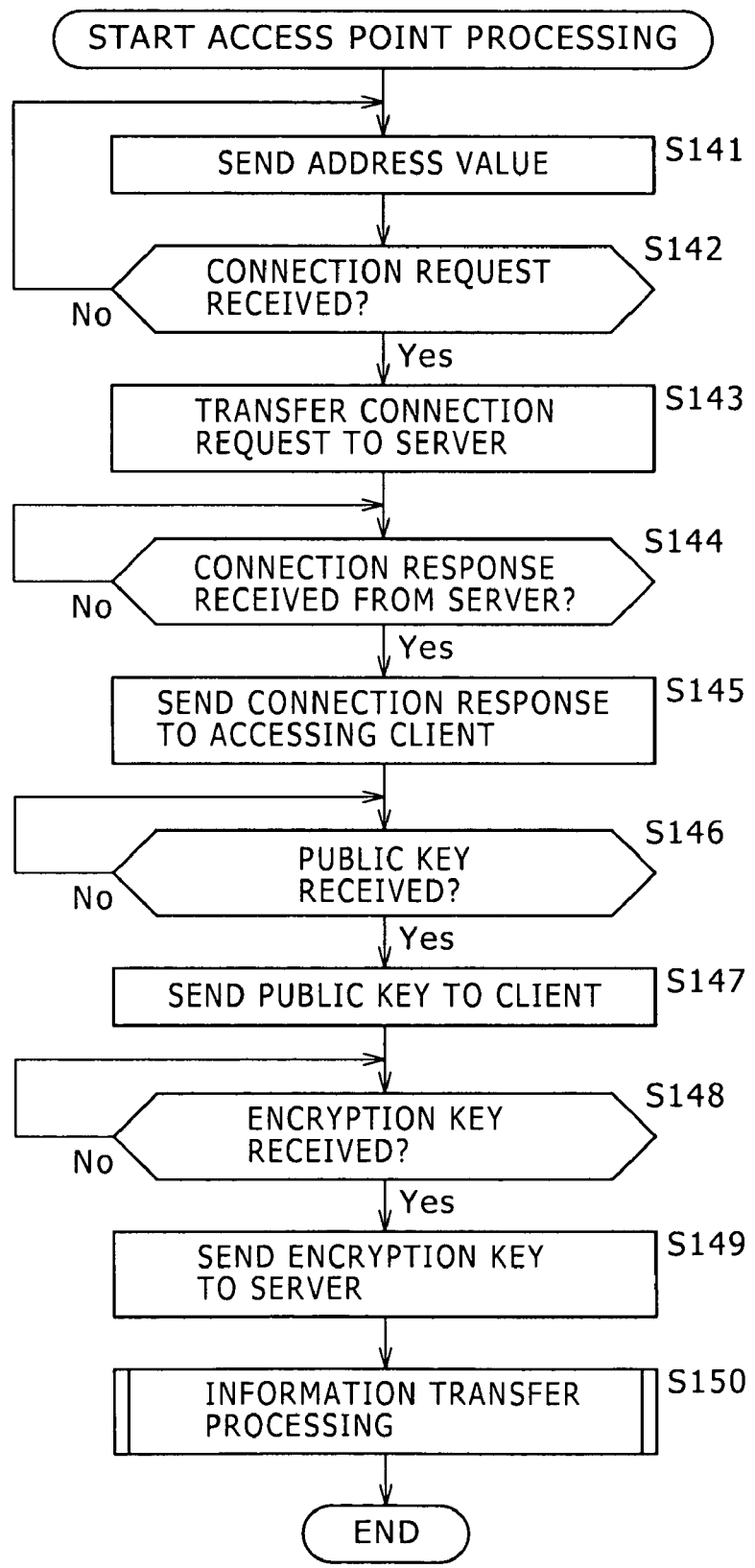
FIG. 19 is a flowchart indicative of processing by the access point.

In the processing of an access point of steps S141 through S150 shown in FIG. 19 corresponding to steps S41 through 49 shown in FIG. 11, a public key is received in step S41 in the example shown in FIG. 11. In the embodiment shown in FIG. 19, a public key is received in step S146 after sending a connection response to the accessing client in step S145. The other processing is substantially the same as that shown in FIG. 11.

Figure 18:
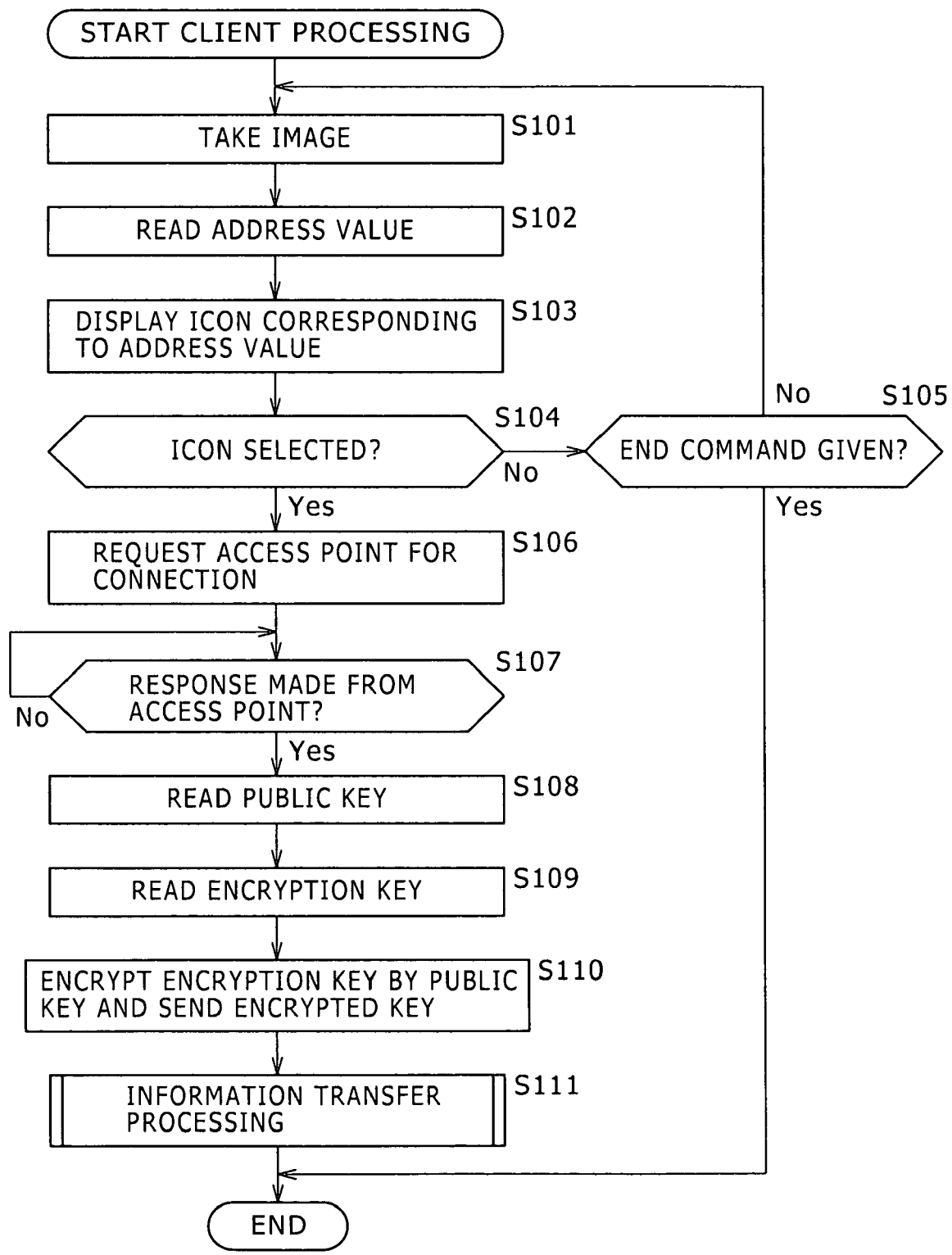
FIG. 18 is a flowchart indicative of processing by the client.

In the processing of the client 12 in steps S101 through. S111 shown in FIG. 18 corresponding to steps S11 through S20 shown in FIG. 10, both an address value and a public key are read in step S12 shown in FIG. 10 as shown in FIG. 18. In step S102 shown in FIG. 18, an address value is read. Instead, if a response is found received from the access point in step S107 shown in FIG. 18, then, in step S108, a light flash signal sent from the access point is received (or imaged) by the imaging block 101 and a public key is read from the received signal by the read block 102. The other processing is substantially the same as shown in FIG. 10.

The above-mentioned embodiment shown in FIG. 20 provides substantially the same effects as the embodiment shown in FIG. 9.

In the above-mentioned embodiments, the detection of a ray of light is executed in a planar manner (namely, a ray of light is imaged by a camera). Alternatively, this detection may be executed in a point manner. For example, one infrared ray receptor element may receive an infrared ray to detect a change in the level thereof. In this case, the user can also confirm the direction in which the infrared ray receptor block is arranged, thereby recognizing which access point is emitting the infrared ray that is being received by the infrared ray reception block. Therefore, this configuration makes it difficult to pick up a light emitted from an hidden place, thereby falling victim to phishing.

Referring to FIG. 21, there is shown an exemplary configuration of a personal computer that executes the above-mentioned sequence of processing by means of software. A CPU (Central Processing Unit) 221 executes various processing operations in accordance with programs and data stored in a ROM (Read Only Memory) 222 or a storage block 228. A RAM (Random Access Memory) 223 stores programs to be executed by the CPU 221 and data necessary therefor, from time to time. These CPU 221, ROM 222, and RAM 223 are interconnected with a bus 224.

The CPU 221 is also connected to an input/output interface 225 via the bus 224. The input/output interface 225 is connected with a input block 226 based on keyboard, mouse, and microphone for example and an output block 227 based on display monitor and speaker for example. The CPU 221 executes various processing operations in accordance with commands entered by the user through the 226. The CPU 221 outputs processing results to the output block 227.

The storage block 228 formed by a hard disc drive for example connected to the input/output interface 225 stores programs to be executed by the CPU 221 and a data necessary therefor. A communications block 229 communicates with external devices via networks such as the Internet and a local area network. Programs may be acquired through the communications block 229 to be stored in the storage block 228.

A drive 230 connected to the input/output interface 225 drives a removable media 231, such as a magnetic disc, an optical disc, a magneto-optical disc, or a semiconductor memory, when it is loaded thereon, thereby getting programs and data therefrom. The programs and data thus obtained are supplied to the storage block 228 to be stored therein.

The above-mentioned sequence of processing operations may be executed by software as well as hardware. When the above-mentioned sequence of processing operations is executed by software, the programs constituting the software are installed in a computer which is built in dedicated hardware equipment or installed, from a network or recording media, into a general-purpose personal computer for example in which various programs may be installed for the execution of various functions.

As shown in FIG. 21, program recording media for storing programs that are installed on a computer for execution is made up of the removable media 231 that are package media made up of a magnetic disc (including a flexible disc), an optical disc (including CD-ROM (Compact Disc-Read Only Memory), a DVD (Digital Versatile Disc), a magneto-optical disc, or a semiconductor memory, the ROM 222 in which programs are temporarily or permanently stored, or a hard disc drive that forms the storage block 228. Storing of programs into program recording media is executed by use of wired or wireless communication media, such as a LAN, the Internet, or digital satellite broadcasting, via the communication block 229 that provides an interface, such as a router and a modem, as required.

It should be noted herein that the steps for describing each program recorded in recording media include not only the processing operations which are sequentially executed in a time-dependent manner but also the processing operations which are executed concurrently or discretely.

It should also be noted that term "system" as used herein denotes an entire apparatus configured by a plurality of component units.

While preferred embodiments of the present invention have been described using specific terms, such description is for illustrative purpose only, and it is to be understood that changes and variations may be made without departing from the spirit or scope of the following claims.

What is claimed is:

1. An information processing method, comprising:
distributing publicly an address value of an access point along with a first key as a light flash signal by a change in a ray of light emitted from a light source;
extracting the address value of the access point and the first key from the ray of light emitted from the light source using an image taken of the access point and in which the ray of light emitted from the light source is imaged, wherein the ray of light emitted from the light source is imaged in the image taken of the access point when a light receptor used in taking the image taken of the access point is arranged in a predetermined direction toward the access point;
displaying a symbol corresponding to the address value of the access point with the image taken of the access point;
encrypting a second key with the extracted first key to transmit the encrypted second key in short-distance communication, based on whether the symbol is selected;
receiving and decrypting the encrypted second key; and
transferring information by use of the second key as a common key.

2. An information processing method, comprising:
distributing an address value of an access point along with a first key as a light flash signal by a change in a ray of light emitted from a light source; and
receiving information encrypted with the distributed first key, the distributed first key being obtained using an image taken of the access point by an information processing apparatus and in which the ray of light emitted from the light source is imaged, wherein the ray of light emitted from the light source is imaged in the image taken of the access point when a light receptor of the information processing apparatus used in taking the image taken of the access point is arranged in a predetermined direction toward the access point, the information encrypted with the distributed first key being transmitted from the information processing apparatus based on whether a symbol corresponding to the address value of the access point is selected when a display unit of the information processing apparatus displays the symbol with the image taken of the access point.

3. A recording medium storing a program for making a computer execute a method of processing information, the method comprising:
distributing an address value of an access point along with a first key as a light flash signal by a change in a ray of light emitted from a light source; and
receiving information encrypted with the distributed first key, the distributed first key being obtained using an image taken of the access point by an information processing apparatus and in which the ray of light emitted from the light source is imaged, wherein the ray of light emitted from the light source is imaged in the image taken of the access point when a light receptor of the information processing apparatus used in taking the image taken of the access point is arranged in a predetermined direction toward the access point, the information encrypted with the distributed first key being transmitted from the information processing apparatus based on whether a symbol corresponding to the address value of the access point is selected when a display unit of the external information processing apparatus displays the symbol with the image taken of the access point.

4. An information processing method, comprising:
receiving a changing ray of light publicly emitted from a light source by which an address value of an access point is transmitted along with a first key as a light flash signal;
reading an address value of an access point and a first key from the received ray of light using an image taken of the access point and in which the ray of light emitted from the light source is imaged, wherein the ray of light emitted from the light source is imaged in the image taken of the access point when a light receptor used in taking the image taken of the access point is arranged in a predetermined direction toward the access point;
displaying a symbol corresponding to the address value of the access point with the image taken of the access point;
encrypting, by a processor, a second key with the read first key to send the encrypted second key by short-distance communication, based on whether the symbol is selected; and
transferring information by use of the second key as a common key.

5. A recording medium storing a program for making computer execute a method of processing information, the method comprising:
receiving a changing ray of light publicly emitted from a light source by which an address value of an access point is transmitted along with a first key as a light flash signal;
reading an address value of an access point and a first key from the received ray of light using an image taken of the access point and in which the ray of light emitted from the light source is imaged, wherein the ray of light emitted from the light source is imaged in the image taken of the access point when a light receptor used in taking the image taken of the access point is arranged in a predetermined direction toward the access point;
displaying a symbol corresponding to the address value of the access point with the image taken of the access point;
encrypting a second key with the read first key to send the encrypted second key by short-distance communication, based on whether the symbol is selected; and
transferring information by use of the second key as a common key.

* * * * *